UNITED STATES PATENT OFFICE.

AUGUST BAUMANN, OF NEW YORK, N. Y.

PROCESS OF PICKLING.

1,003,320. Specification of Letters Patent. Patented Sept. 12, 1911.

No Drawing. Application filed May 11, 1910. Serial No. 560,638.

*To all whom it may concern:*

Be it known that I, AUGUST BAUMANN, a citizen of the United States, and a resident of the city of New York, borough of Brooklyn, in the county of Kings and State of New York, have invented a new and Improved Process of Pickling, of which the following is a full, clear, and exact description.

The object of the invention is to provide a new and improved process of making edible and easily digestible salt pickles from green cucumbers, in a very simple and economical manner, and reducing the loss of pickles, that usually become hollow and soft, to a minimum.

The process consists essentially in subjecting green cucumbers to the action of a brine formed of dissolved common salt, chemically pure hydrochloric acid and soda benzoate.

The process is carried out in detail as follows: The green cucumbers, after being thoroughly washed in cold water, are packed into a barrel or other receptacle, and, if desired, herbs and spices may be added to suit, and then the head of the barrel is placed in position, after which a cold brine is passed by way of the bung hole into the barrel. The brine used consists of common salt in solution, chemically pure hydrochloric acid and soda benzoate, mixed while in cold condition.

In practice, common salt is dissolved in twenty gallons of water, to test from 20% to 32% according to the standard 100% brine hydrometer, the quantity of the salt depending on the desired saltiness of the pickles to suit different tastes. From two to eight ounces of chemically-pure hydrochloric acid (specific gravity 1.20), and a like amount of soda benzoate are added to the twenty gallons of salt solution, and then the ingredients are stirred and agitated, to insure even distribution thereof.

The brine is sufficient to fill up the barrel containing the green cucumbers, it being understood that the brine fills the interstices between adjacent cucumbers, so that each cucumber is thoroughly subjected to the action of the brine. The brine is allowed to act on the cucumbers for about twenty-four hours, so that the brine penetrates the cucumbers, the hydrochloric acid serving mainly as the penetrating medium. About two gallons of brine are withdrawn from the barrel, after the above-mentioned time has elapsed, and then the barrel is closed up by inserting the bung in the bung hole, it being understood that the barrel is both air and water-tight.

By withdrawing two gallons of the brine from the barrel, as above mentioned, sufficient space is had within the barrel for the expansion of the brine by heat induced by the fermentation process taking place within the barrel, the space receiving any gases that may arise through the process of fermentation, so that the cucumbers and the remaining brine are relieved of pressure. The barrel after being closed up may be stored or shipped to the market, but should not be opened for about a week or two.

By treating the cucumbers in the manner described, the resulting pickles are wholesome and digestible, and the loss of pickles by becoming hollow and soft is reduced to a minimum.

By the process described, the fermentation that takes place in the barrel is controlled, and a too rapid and injurious fermenting of the pickles is prevented, and at the same time the hydrochloric acid provides a favorable medium for the propagation of the desired acidifying bacteria, and also provides a preventive of the growth of injurious, putrefying and gas-forming bacteria, molds and yeasts.

The hydrochloric acid, as above mentioned, forms the penetrating medium, that is, it supplies an osmosing agent, to render the epidermis and cellular tissue of the cucumbers more permeable to the preservative action of the salt throughout, preventing decomposition inside of the pickles, and which decomposition is the cause of pickles becoming hollow and soft.

By the process described, the pickles, while used in a green state, can be transported to the market, so as to arrive in a new and fresh condition and of a superior flavor, taste and quality.

Having thus described my invention, I claim as new and desire to secure by Letters Patent:—

The herein described process of pickling, which consists in packing green cucumbers in a vessel, subjecting them to the action of a brine formed of dissolved common salt from 20 to 32%, and adding two to eight ounces of chemically pure hydrochloric acid and two to eight ounces of soda benzoate to every twenty gallons of brine, allowing the brine to penetrate the cucumbers, then removing a portion of the brine from the vessel, and finally closing the vessel.

In testimony whereof I have signed my name to this specification in the presence of two subscribing witnesses.

AUGUST BAUMANN.

Witnesses:
 THEO. G. HOSTER,
 PHILIP D. ROLLHAUS.